United States Patent [19]

Boyens

[11] 4,016,748

[45] Apr. 12, 1977

[54] PIPELINE AND LEAK LOCATER AND METHOD

[76] Inventor: Virgil C. Boyens, R.R. 1, Denison, Iowa 51442

[22] Filed: Nov. 10, 1975

[21] Appl. No.: 630,694

[52] U.S. Cl. ............................................ 73/40.5 R
[51] Int. Cl.² ......................................... G01M 3/28
[58] Field of Search ............ 73/405 R, 405 A, 49.1, 73/49.5; 33/126, 126.5, 126.6, 137 R, 138; 138/97; 346/33 P

[56] References Cited

UNITED STATES PATENTS

| 1,919,546 | 7/1933 | Fletcher | 73/40.5 R UX |
| 2,601,248 | 6/1952 | Brenholdt | 73/40.5 R UX |
| 2,909,975 | 10/1959 | Ulrich | 73/40.5 R X |
| 3,495,546 | 2/1970 | Brown et al. | 73/40.5 R X |
| 3,691,819 | 9/1972 | Guest | 73/40.5 A |

*Primary Examiner*—Richard C. Queisser
*Assistant Examiner*—Joseph W. Roskos
*Attorney, Agent, or Firm*—Zarley, McKee, Thomte, Voorhees & Sease

[57] ABSTRACT

A method and apparatus for detecting a leak in a conduit. The method generally comprises flowing a fluid through a conduit at superatmospheric pressure, placing within the conduit a floatable leak sensor which is responsive to pressure and velocity differentials caused by a leak, moving the leak sensor through the conduit along with the fluid, whereby the leak sensor stops movement through the conduit at the location of a leak. The apparatus comprises a leak sensor casing, a floatable leak sensor mounted within the casing for movement along with fluid through a line of test pipe, and means on the casing to attach casing to the test pipe to allow direct communication between fluid and the test pipe and the floatable leak sensor.

11 Claims, 5 Drawing Figures

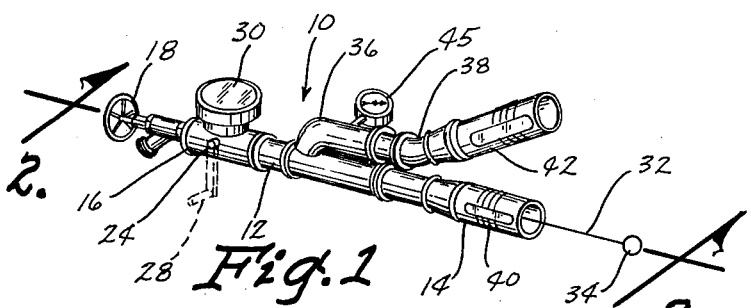
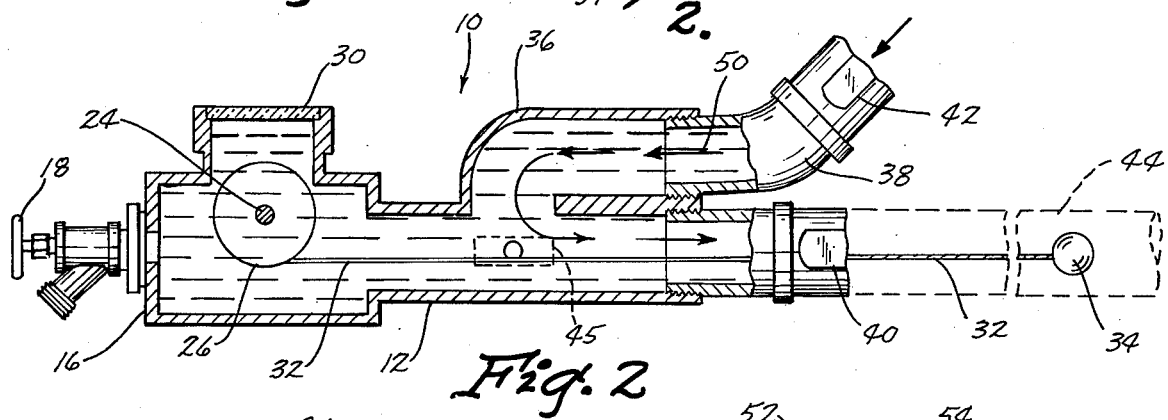
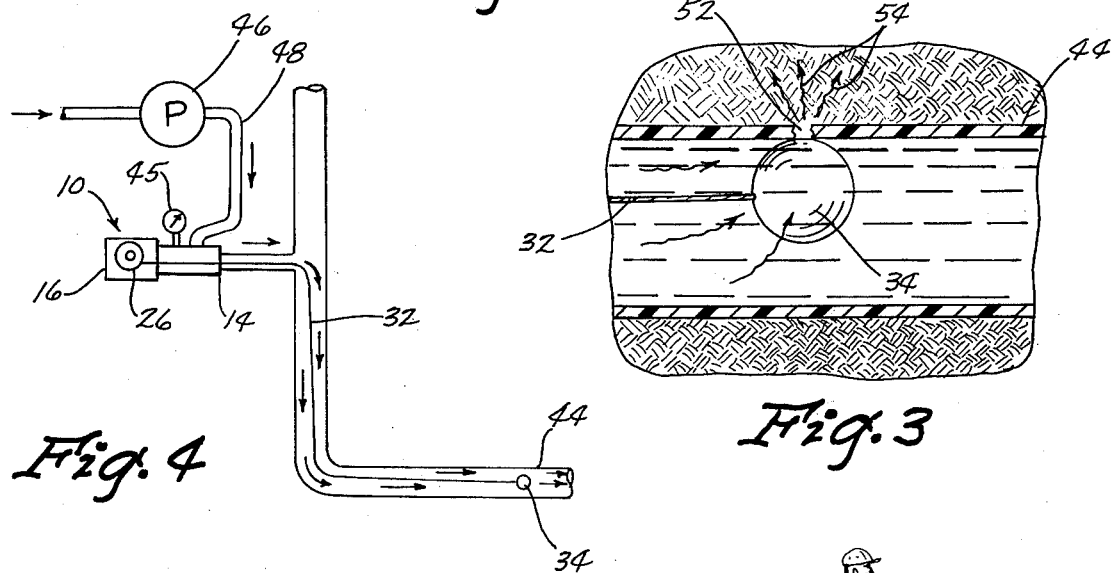
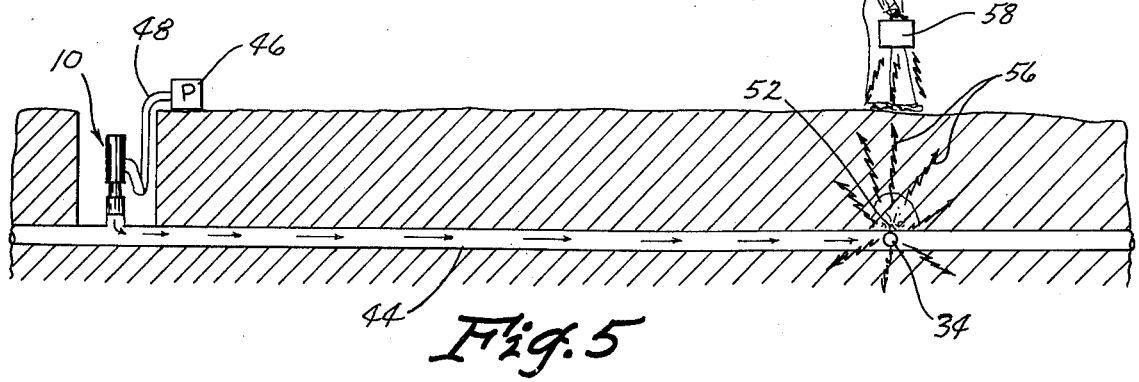

PIPELINE AND LEAK LOCATER AND METHOD

BACKGROUND OF THE INVENTION

One of the problems with underground pipe sysstems is the difficulty of locating a leak in that system. For example, if the underground pipe system is for transferring water from one place to another, often times the only apparent visual indication of a leak is a certain wetness on the soil. Of course, depending upon how deep the piping is buried, this may not even be present. In any event, this fails precisely to locate the leak and necessitates digging to uncover the pipe by a "hit or miss method" until the precise point of the leak is located. This is not only time consuming, it is quite expensive for the labor involved.

In addition, it often happens that original records and drawings are destroyed and thus the precise path of a pipe or conduit, the two terms being utilized herein interchangeably, is no longer known. This of course makes it extremely difficult to ever attempt to locate a leak.

It is an object of this invention to provide a method and apparatus which has the capability of pinpointing precisely the location of a leak in a pipe or a conduit.

Yet another object of this invention is to provide a method and apparatus which will pinpoint leaks precisely without employing extremely complex and costly equipment.

Another object of this invention is to provide a pipeline and leak locater which is simple to operate, portable, and can be conveniently used with a minimum of required skill by the operator.

The method and means of accomplishing the objects of this invention will become apparent from the following detailed description of the invention.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the line and leak locator of this invention.

FIG. 2 is a sectional view along the longitudinal axis of the line and leak locator of this invention as taken along line 2—2 of FIG. 1.

FIG. 3 is an elevated fragmentary view showing the leak sensor as it stops at a leak in a conduit with the conduit having a fluid traveling therethrough.

FIG. 4 shows how the leak sensor is utilized with a pump in order to pump fluid through the system.

FIG. 5 shows an alternative embodiment of the invention which utilizes a leak sensor having a sound transmitting device therein, with the operator carrying a sound receiver which indicates on a meter when it is precisely over the sound transmitting device, thus locating the leak.

DETAILED DESCRIPTION OF THE INVENTION

The leak locater, depicted generally as 10, is comprised of a pipe casing 12, which for purposes of description will be described as having a forward end 14 and a rearward end 16. Rearward end 16 of casing 12 is closed and has a manual shutoff valve of conventional construction, depicted generally at 18, which when open, allows fluid to drain through adjoining drain spout 20. Of course, when the manual shutoff valve is closed by turning valve 18 closed, no fluid can pass through drain spout 20. As it is apparent from FIG. 2, the fluid entering drain spout 20 does so by passing through fluid outlet 22 in the rear wall or end 16 of casing 14.

Positioned forwardly of rear wall 16 extending transverse to the longitudinal axis of casing 12 is rotatable axle 24. Mounted on rotatable axle 24 to rotate therewith is reel 26. Crank 28 is mounted to the exteriorly exposed portion of rotatable axle 24 on the outside of casing 14 and is operable as a conventional freewheeling crank. To rotate reel 26, crank 28 is pushed inwardly wherein it meshes with a notch in axle 24 to allow rotation thereof. Removal of the inward pressure from crank 28 disengages the notch and reel 24 is again freewheeling. Since the employment of a freewheeling crank is conventional and well known, its specific description and detailed drawing is not depicted herein.

Positioned directly above reel 26 so that reel 26 may be visually inspected is a sight glass 30. Of course, sight glass 30 is in sealing relationship with the casing 14 so that no fluid may pass therethrough. Thus by looking through sight glass 30, one may examine reel 24. Wound around reel 24 is cord or line 32 which is preferably a 30-pound test nylon leader line.

As previously mentioned, one end of cord 32 is attached to reel 26 so that cord 32 may be wound upon reel 26 by rotating crank 28. Attached to the opposite end of cord 32 is a floatable leak sensor 34, which will be described in detail hereinafter.

Adjoining casing 12 forwardly of reel 26 but rearwardly of the forward end 14 of casing 12 is a pump inlet conduit 36. Pump inlet conduit 36 is in communication with the interior of casing 12 in such a manner that fluid which passes through pump inlet conduit 36 flows in a direction cocurrent with the direction of flow through casing 14 from its rearward end 16 toward its forward end 14. As specifically depicted in FIGS. 1 and 2, pump inlet conduit 36 extends upwardly and forwardly parallel to casing 14 and terminates in an upward and forward bend 38. The forward end of casing 14 and of pump inlet conduit 36 each have quick connect clamps 40 and 42, respectively, of known construction to allow the forward end of casing 14 to be connected via quick clamp 40 to a pipeline which is to be tested and to allow the forward end of pump inlet conduit 36 to be connected to a pump, typically via a flexible hose. Quick connect clamps are of known construction and will not be described here in detail.

Positioned on casing 14 is a pressure gauge 45. Pressure gauge 45 senses the fluid pressure within casing 14.

Floatable leak sensor 34 is attached to cord 32 by an adhesive or other conventional means. Of course, the adhesive must not be soluble in the fluid passing through casing 14. Floatable leak sensor 34 can typically be a hollow spherical member, often made of polymerized plastic material of the nature of a ping pong ball or a fishing bobber. The important criteria for floatable leak sensor 34 is that the sensor is floatable in the fluid passing through casing 14 and preferably is spherical in shape and hollow. Ideally, floatable leak sensor 34 is a spherical member having a diameter at least equal to the radius of the pipeline which is being tested and preferably having a diameter within the range of from about two-thirds to about three-fourths of the interior diameter of the pipe casing which is being tested for leaks. It has been found that employment of a floatable leak sensor 34 having a diameter within the previously specified range provides the most suitable results by quickly locating and pinpointing leaks in a conduit which is being tested.

In a preferred embodiment of this invention, floatable leak sensor 34 is spherical in shape, hollow and has sealed therewithin a sound transmitting device. Such sound transmitters are of conventional construction and will therefore not be described in detail herein. They are available from a wide variety of manufacturers.

In actual operation leak detecting apparatus works in the following manner which is presented for illustrative purposes only and not as a limiting factor upon the description of how the apparatus of this invention may be utilized. A pipeline which is to be tested, depicted in FIGS. 3, 4 and 5 as 44, has all outlets from that pipeline shut down. Leak sensor casing 14 at its forward end is connected into the flow line of test pipeline 44 via quick connect clamp 40. The water flow into line 44 is thereafter shut down. A pump 46 is connected via quick connect clamp 42 to pump inlet conduit 36 so that the fluid may be pumped through pump 46, through the flexible hose 48 into pump inlet conduit 36 in accord with the directional arrows of FIG. 2 depicted at 50. Pump 46 can be a variety of conventional types of pumps and for example, can be a Flint and Walling pump. Of course, the precise pump capacity and size will depend upon the size of test line conduit 44 and the amount of fluid flow passing therethrough. Preferably the pump has the capability of providing a pressure within the test pipeline 44 within the range of from 20 to 50 pounds per square inch and gauge preferably 35 to 45 pounds per square and most preferably of about 40 pounds per square inch. With manual drain valve 18 closed, pump 46 pumps, for purposes of this illustration we will assume water, through pump 46, through flexible hose 48, through quick connect clamp 42 into pump inlet conduit 36 in accord with the flow pattern shown by directional arrows 50 of FIG. 2. The fluid or water is pumped into test casing 44 at a pressure of 40 pounds per square inch. The forward movement through test pipeline 44 of fluid under pressure unwinds the cord 32 from reel 36 and floatable leak sensor 34 passes in the direction of flow and at the same velocity as does fluid being transferred through test pipeline 34. As will be recalled leak sensor 34 is floatable in the fluid in test pipeline 44.

As depicted in FIG. 3, since the fluid in line 44 is under pressure, a fluid flow up stream, or to the left as viewed in FIG. 3, of the leak 52 will be at a given velocity and at 40 pounds per square inch pressure since that is the pressure generated by pump 46. Correspondingly, the flow downstream from leak 52 will be at a somewhat slower velocity and at a decreased pressure. Fluid will escape through leak 52 as indicated by directional arrows 54 at a high velocity with a rapid pressure decrease. There will be some turbulence at the position of the leak as opposed to laminar flow through the remainder of test pipeline 44. Floatable leak sensor 34 travels in a laminar flow pattern through pipe 44 until it reaches leak 52 wherein it responds to the pressure and velocity differentials caused by the leak as well as the turbulence caused by the leak and stops precisely at the point of leak 52. Of course, when floatable leak sensor 34 stops, cord 32 stops unwinding from reel 26.

In addition, if the leak 52 is sufficiently small in comparison with the diameter of floatable leak sensor 34, floatable leak sensor 34 may have a tendency to partially plug leak 52 with a resulting pressure increase in the test pipeline 44 which is immediately sensed by pressure gauge 45.

In order to pinpoint the leak, cord 32 can have linear feet marked thereon for visual inspection through sight glass 30. As a specific illustration of operation of this invention, a pipe which employed a one-sixteenth inch leak 52,300 feet from its entrance with pump 46 pumping at 50 pounds per square inch gauge took between 20 and 25 seconds for floatable leak sensor 34 to stop at leak 52.

An alternative embodiment of the invention is shown in FIG. 5 wherein leak sensor 34 contains an electronic sound transmitter. In this embodiment, if desired, there is no need to employ cord 32 attached to floatable leak sensor 34. The electronic sound transmitting device must be sufficiently small to still enable leak sensor 34 to be floatable in the fluid and test pipeline 44. In like manner, the sensor 34 stops at leak 52, but in this instance is continually transmitting a sound schematically depicted at 56. An individual walks above ground carrying sound sensitive receiver 58 having a visual inspection gauge indicating the closeness to the source of sound 56. The individual reading the gauge on sound receiver 58 stops directly over leak 52 as indicated in FIG. 5.

In the embodiment which employs cord 32, of course, after reading the distannce from reel 26 to the leak 52, the cord 32 is rewound on reel 26 via the use of crank 28.

If desired, to relieve the pressure within conduit 44, before removing the device from the line of conduit 44, the presssure within conduit 44 can be relieved by opening manual shutoff valve 18 to allow fluid to drain outwardly from drain spout 20 in order to equalize the pressure inside and outside of conduit 44.

As will be apparent to those skilled in the art, certain modifications of the basic method and apparatus of this invention can be made without departing from the spirit and scope of the invention.

For example, if one desires to locate a sharp angle or bend in the test pipe line 44, a spherical leak sensor 34 may be employed which will wedge itself at the test pipeline bend.

As previously mentioned cord 32 can be marked to designate the number of feet of cord which is unwound. One method of marking cord 32 is by color code marking. For example, the first 100 feet can be marked white, the second 100 feet, blue, and so on. Each 10-foot section can then be banded with a color band. Thus if yellow is a 20-foot color band and the yellow band appears on the blue cord in sight glass 30 it is apparent that 120 feet of cord 32 has been extended.

What is claimed is:
1. A method of detecting a leak in a conduit, said method comprising;
flowing a fluid through said conduit at super-atmospheric pressure,
placing within said conduit a floatable leak sensor which is responsive to pressure, velocity and turbulence differentials caused by a leak in said conduit,
moving said leak sensor through said conduit along with said fluid, said floatable leak sensor automatically stopping movement through said conduit at the location of a leak in said conduit.

2. The method of claim 1 wherein an additional step includes determining from the stopping location of said floatable leak sensor, the distance from the position at which said floatable leak sensor entered said conduit, to said leak.

3. The method of claim 2 wherein all outlets to said conduit, except one which is believed to be downstream from said leak, are shut off and an additional step includes pumping fluid through said conduit, along with said sensor at a pressure within the range of from about 20 psig. to 50 psig.

4. A pipeline and leak locator for detecting leaks in pipelines used for transferring fluids, comprising
 a leak sensor casing,
 a floatable leak sensor mounted within said casing for movement along with fluid flowing through the line of a test pipe,
 said sensor being responsive to pressure, turbulence and, velocity differentials within said test pipe caused by a leak in said test pipe so that said sensor stops at said leak, and
 means on said casing to attach said casing to said test pipe to allow direct communication between fluid in said test pipe and said floatable leak sensor.

5. The device of claim 4 wherein said leak sensor casing has a rearward end and a forward end, with said leak sensor attached to a reel which is rotatably mounted within said leak sensor casing forward of the rearward end of said casing.

6. The device of claim 4 wherein said floatable leak sensor is attached to said reel by a cord.

7. The device of claim 6 wherein said floatable leak sensor is a floatable hollow sphere having a diameter at least equal to the radius of said test pipe.

8. The device of claim 7 wherein said leak sensor casing has a pump inlet conduit positioned forward of said reel but rearwardly of the forward end of said casing.

9. The device of claim 8 wherein said pump inlet conduit is adapted to alow fluid to be pumped into said test pipe in the direction of fluid low through said test pipe.

10. The device of claim 4 wherein said floatable leak sensor has a sound transmitter positioned therewithin.

11. The device of claim 10 which includes a sound receiver for sound transmitted by said sound transmitter to aid in locating the precise position of said leak sensor, after said sensor has stopped at the position of a leak in said test pipe.

* * * * *